United States Patent [19]

Ohno et al.

[11] Patent Number: 5,430,277
[45] Date of Patent: Jul. 4, 1995

[54] IMAGE RECORDING MEDIUM, A PROCESSING APPARATUS THEREOF, AND AN ENTRANCE/EXIT CONTROL SYSTEM USING THE IMAGE RECORDING MEDIUM

[75] Inventors: Tadayoshi Ohno; Takashi Yamaguchi; Shinichi Itoh, all of Kawasaki, Japan

[73] Assignee: Kabushiki Kaisha Toshiba, Kawasaki, Japan

[21] Appl. No.: 124,602

[22] Filed: Sep. 21, 1993

[30] Foreign Application Priority Data

Nov. 10, 1992 [JP] Japan .................. 4-300104

[51] Int. Cl.$^6$ ............................................ G06K 19/08
[52] U.S. Cl. .................................. 235/382; 235/487; 283/901
[58] Field of Search ................ 235/380, 382, 492, 487; 283/901

[56] References Cited

U.S. PATENT DOCUMENTS

| | | | |
|---|---|---|---|
| 3,829,661 | 8/1974 | Silverman et al. | 235/382 |
| 4,245,213 | 1/1981 | Kriger | 235/382 |
| 4,667,087 | 5/1987 | Quintana | 235/380 |
| 4,960,982 | 10/1990 | Takahira | 235/380 |
| 4,980,679 | 12/1990 | Klaubert | 235/380 |
| 5,083,815 | 1/1992 | Scrymaeour et al. | 283/72 |
| 5,282,651 | 2/1994 | Alonso | 283/901 |

FOREIGN PATENT DOCUMENTS

| | | | |
|---|---|---|---|
| 211791 | 9/1986 | Japan | 235/380 |
| 188028 | 8/1987 | Japan | 235/492 |
| 41414 | 2/1991 | Japan | 235/382 |
| 3116594 | 5/1991 | Japan . | |
| 3212790 | 9/1991 | Japan . | |
| 3218898 | 9/1991 | Japan . | |

OTHER PUBLICATIONS

IBM Technical Disclosure Bulletin, vol. 29 No. 4 Sep. 1986 pp. 1149–1150.

*Primary Examiner*—John Shepperd
*Attorney, Agent, or Firm*—Cushman Darby & Cushman

[57] ABSTRACT

A visible image displaying medium comprises a substrate on which a visible image is formed, and a displaying layer, disposed on the substrate, when the displaying layer is heated to a first temperature, changing to a transparent state to display the visible image and when the displaying layer is heated to a second temperature higher than the first temperature, changing to a cloudy state to shut the visible image. Further, an apparatus for processing a recording medium which has a substrate on which a visible image is formed and a displaying layer, disposed on the substrate, when the displaying layer is heated to a first temperature, changing to a transparent state to display the visible image and when the displaying layer is heated to a second temperature higher than the first temperature, changing to a cloudy state to shut the visible image, the apparatus comprises means for heating the displaying layer to the first temperature to display the visible image, and means for reading the visible image on the recording medium through the displaying layer.

12 Claims, 14 Drawing Sheets

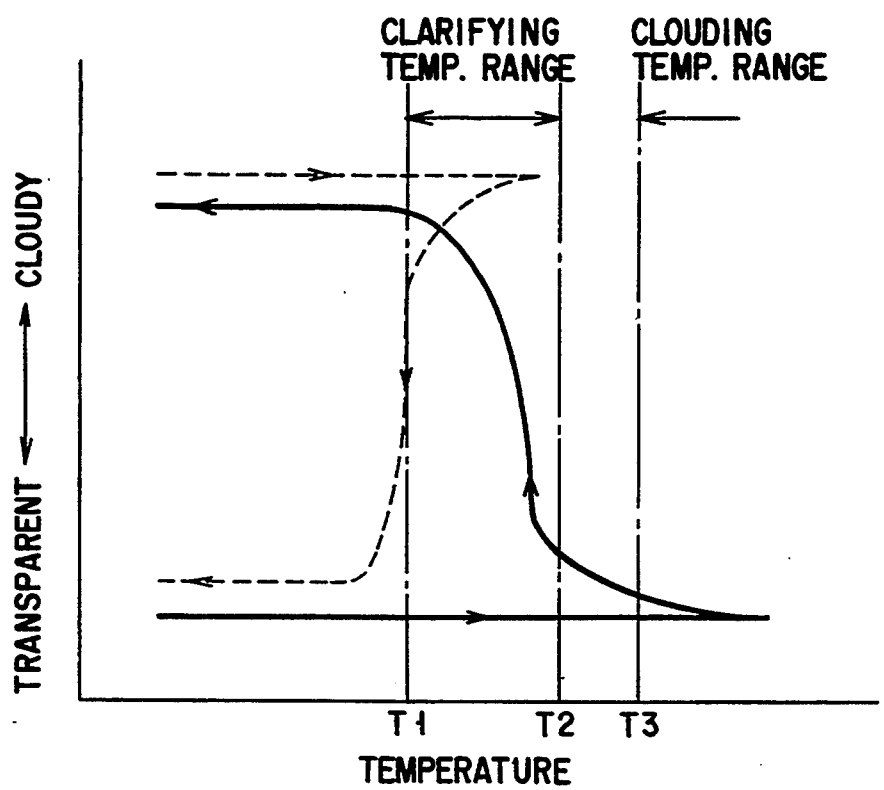
F I G. 3
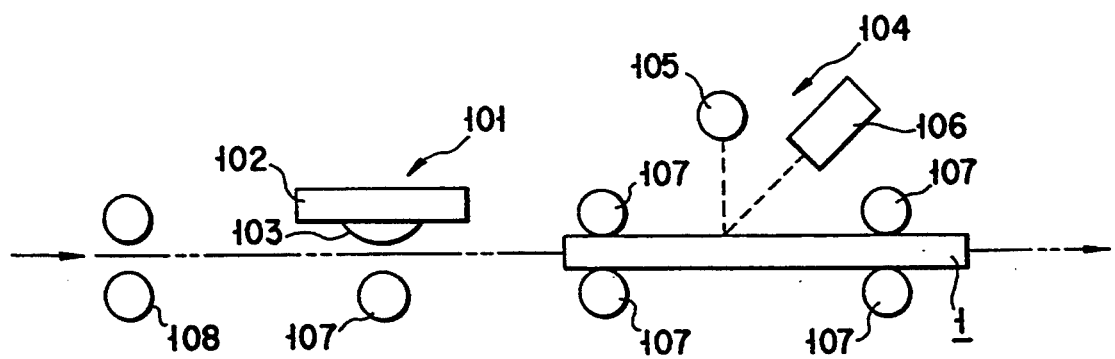
F I G. 4

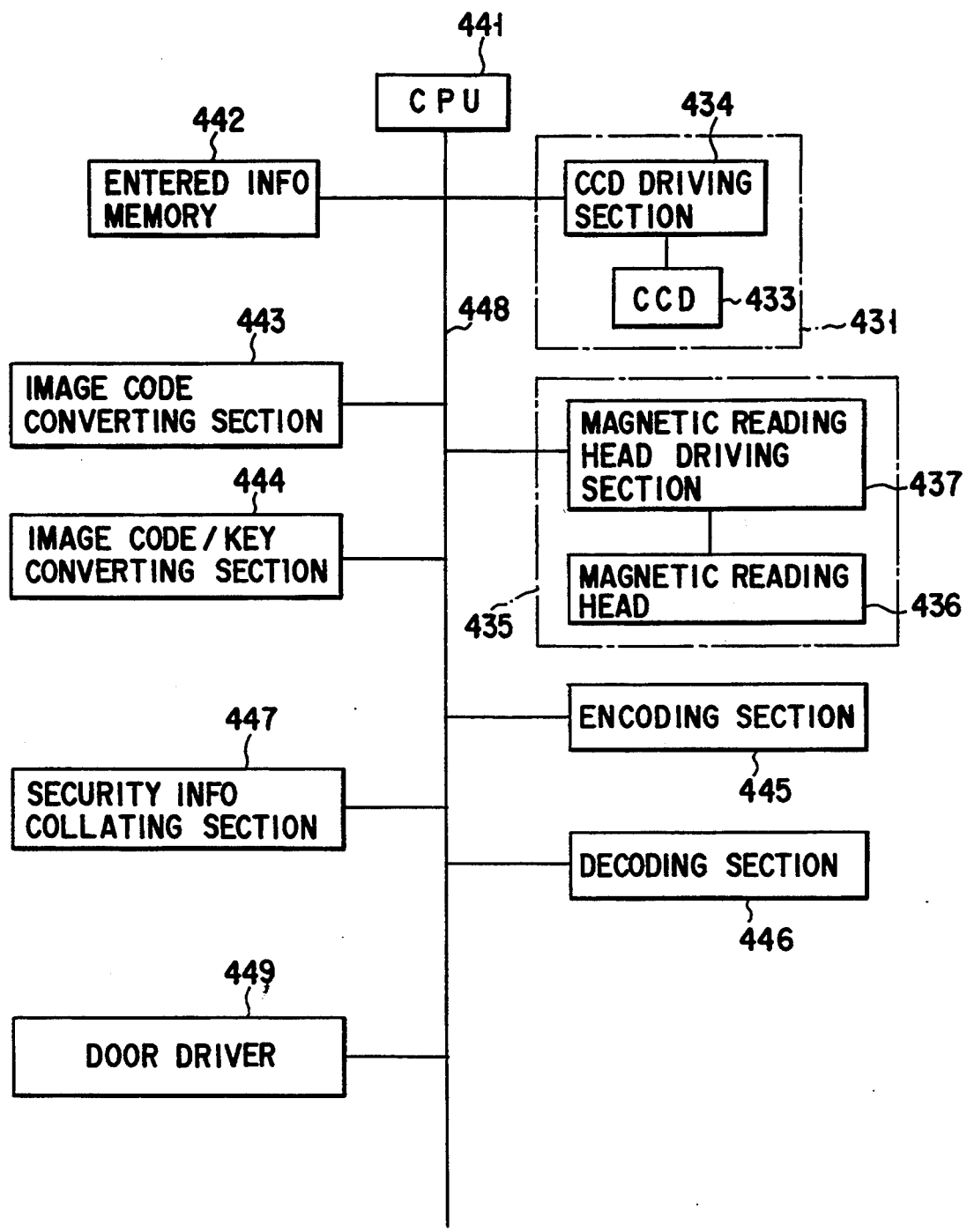
F I G. 21

IMAGE RECORDING MEDIUM, A PROCESSING APPARATUS THEREOF, AND AN ENTRANCE/EXIT CONTROL SYSTEM USING THE IMAGE RECORDING MEDIUM

BACKGROUND OF THE INVENTION

1. Field of the Invention

This invention relates to a displaying medium allowing the repeated setting of a security image in a display/undisplay state or in a mechanically readable/unreadable state by, for example, reversibly recording and erasing the image, a recording apparatus using the displaying medium, and an entrance/exit control system using the displaying medium.

2. Description of the Related Art

Recently, magnetic cards and IC cards with an information storing section have been used in various applications such as telephone cards, prepaid cards, or ID cards.

As such cards are used more and more, however, there arise problems such as forged cards, illegally altered cards, or unauthorized use of cards. Because of such problems, there are strong demands for an assurance of the security of the card and the card-based system.

To cope with such problems, a method has been proposed which provides a card with pieces of information used to examine the truth of the card and combines the pieces of information to increase the security.

For example, an IC card has been proposed which has a display section carrying a visible image or a bar code on its surface and which causes the visible image or the bar code to correspond to the information read from its built-in memory circuit (for example, as disclosed in Jpn. Pat. Appln. KOKAI Publication No. 1-174171).

This proposed card, however, has the problem that the card can be forged by copying the memorized information and clipping the display section carrying an visible image or a bar code and pasting it on a forged card.

Further, an authenticity checking method has been proposed in which a picture element or an image (hologram) sensible only when illuminated by reference light of a specific wavelength, is printed in a specific position on the surface of a card with a memory section, information is written in the card in the form of converted data encoded using the positional data on the picture element or image, and when the data is to be read, the positional data on the picture element or image is sensed by projecting the reference light, and the card is checked by collating the data obtained by inverse conversion, using the positional data, of the stored converted data with the previously entered data (for example, as disclosed in Jpn. Pat. Appln. KOKAI Publication No. 3-212790).

Although this proposal provides excellent security control, it requires a special light source and a special sensor, resulting in a complicated apparatus. Thus, there is the danger that a decrease in the reliability of the apparatus due to its complexity degrades the security.

Further, there is a card that allows the recording of a using state on the card in a visible manner so that the user can check the present using state of the card.

Because in such a card, the capacity of its recording section in which the using state is recorded is limited, the card must be reissued when the recording section has no space left in the course of recording even if the card is still valid.

To overcome this problem, a card has been devised in which the recording section is made of a reversible recording material so that the using state can be rewritten many times (for example, as disclosed in Jpn. Pat. Appln. KOKAI Publication No. 3-116594 or Jpn. Pat. Appln. KOKAI Publication No. 3-218898).

Cards of this type have the advantage that they enable repeated recording and erasing of an image but have the disadvantage that their security is low because the image itself can be rewritten and forged easily.

SUMMARY OF THE INVENTION

The object of the present invention is to provide an image displaying medium of a simple structure that provides an improved secrecy at low cost and an entrance/exit control system using this image displaying medium.

The foregoing object is accomplished by providing a visible image displaying medium comprising: a substrate on which a visible image is formed; and a displaying layer disposed on the substrate. When the displaying layer is heated to a first temperature, it is changed to a transparent state to display the visible image and when the displaying layer is heated to a second temperature higher than the first temperature, it is changed to a cloudy state to shut off the display of the visible image.

The foregoing object is also accomplished by providing an apparatus for processing a recording medium which has a substrate on which a visible image is formed and a displaying layer disposed on the substrate such that when the displaying layer is heated to a first temperature, it is changed to a transparent state to display the visible image and when the displaying layer is heated to a second temperature higher than the first temperature, it is changed to a cloudy state to shut of the display of the visible image, the apparatus comprising: means for heating the displaying layer to the first temperature to display the visible image; and means for reading the visible image on the recording medium through the displaying layer.

In the present invention, the visible image displaying medium (a first card) of the above arrangement and the processing apparatus of the medium process the image pattern as follows. Because a specific image pattern formed on the visible image displaying medium is blinded by the cloudy state layer at room temperature, the image pattern is kept secret from a third party. In the processing apparatus, after the first card is accepted, it is heated by the heating means to the first temperature to clarify the displaying layer in a state where people outside the apparatus cannot see the action. Next, after the reading means has read the image pattern, the heating means heats the card to the second temperature to shut off the image pattern. The card is then discharged outside the apparatus. This prevents the user of the card from directly knowing the image pattern. Consequently, it is possible to provide an entrance/exit control system using the relatively simple-structure image displaying medium with improved secrecy.

The forgoing object is further accomplished by providing an image recording medium comprising: a substrate; and means, formed on the substrate, for recording a given image pattern by allowing its given area to be made cloudy at a first temperature and to be made transparent at a second temperature.

The foregoing object is still further accomplished by providing an image recording medium processing apparatus comprising: means for receiving the image recording medium (the second card); and means for rewriting the image pattern on the image recording medium by heating the image pattern a temperature to make the pattern cloudy and to another temperature to make the pattern transparent.

With the present invention, the image recording medium of the above arrangement and the processing apparatus of the medium provides a high security system although it is of simple structure as described below. In the processing apparatus, by causing the rewriting means to heat the recording means of the second card to a temperature to write a given image pattern and to the second temperature for clarification in the card, a given image pattern can be recorded in the second card repeatedly. This makes it possible to apply a recording card of relatively simple structure to, for example, an entrance/exit control system for a specified section.

By combining the second card with magnetic storing means and further combining this combination with the image pattern by, for example, a suitable encoding method, a more sophisticated entrance/exit control system can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings which are incorporated in and constitute a part of the specification, illustrate presently preferred embodiments of the invention, and together with the general description given above and the detailed description of the preferred embodiments given below, serve to explain the principles of the invention.

FIG. 3 is a characteristic diagram of a material forming a changeable layer;

FIG. 4 is a schematic diagram of an apparatus for performing security control using the card;

FIG. 21 is a block diagram schematically showing an important portion of the apparatus;

DETAILED DESCRIPTION OF THE PREFERRED EMBODIMENTS

Hereinafter, an embodiment of the present invention will be explained, referring to the accompanying drawings.

Figure 1:
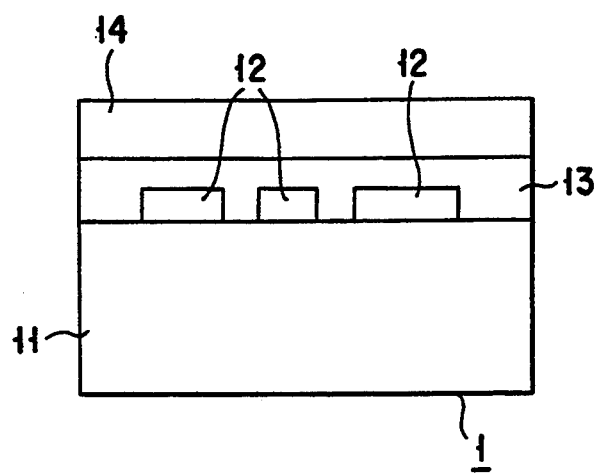
FIG. 1 is a sectional view schematically showing the construction of a card according a first embodiment of the present invention.

FIG. 1 schematically shows the construction of a card 1 according to a first embodiment of the present invention.

In FIG. 1, the card 1 includes a substrate 11 made of white vinyl chloride resin or polyester resin, a bar code printed on the surface of the substrate 11, a colored security image 12 of a specific figure or a specific character, a changeable layer 13 whose transmittance changes reversibly, and a protective layer 14 made of a light-transmitting material (resin).

The substrate 11 is formed to a suitable thickness ranging from, for example, approximately 10 $\mu$m to several mm.

The changeable layer 13 reversibly changes between a cloudy state and a transparent state, depending on, for example, temperature. It is made of a material such as a high and low molecular composite film of polyvinyl chloride and polyvinyl acetate (the details of which will be explained later).

Figure 2A:
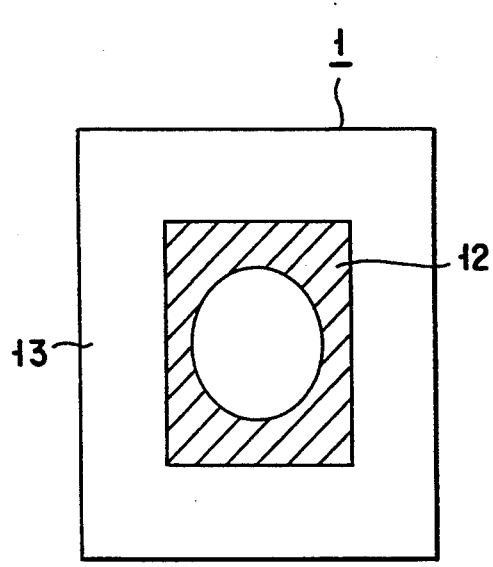
FIGS. 2A and 2B each show an example of a security image on the card.
Figure 2B:
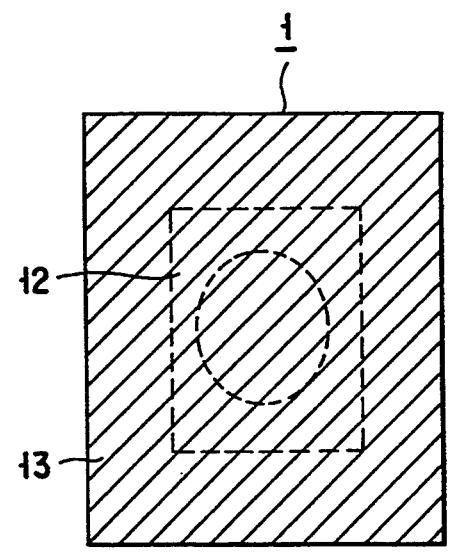

FIGS. 2A and 2B show an example of a security image 12 on the card 1.

In this embodiment, the security image 12 is, for example, a rectangle with a round hole in it (a special figure) and is painted with a color presenting a reasonable contrast to the white substrate 11.

Clarifying the changeable layer 13 causes the security image 12 to take a state that allows visible inspection or a state that enables mechanical reading (FIG. 2A).

Clouding the changeable layer 13 causes the image 12 to take an undisplay state that prevents visible inspection or a state that disables mechanical reading (FIG. 2B).

FIG. 3 shows a characteristic of a material forming the changeable layer 13.

The material forming the changeable layer 13 is a material that changes reversibly between a transparent state and a cloudy state, depending on the temperature given (for example, as disclosed in Jpn. Pat. Appln. KOKAI Publication No. 55-154198).

Specifically, the material has such a characteristic that when the material in the transparent state is raised in temperature from room temperature to the clouding temperature (T3) or higher, it changes from the transparent state to the cloudy state (shown by a solid line in the figure), and remains in the cloudy state even when the temperature returns to room temperature.

Then, when the material is raised in temperature from room temperature to the clarifying temperature range (T1-T2, T2<T3) and is then returned to room temperature, it changes from the cloudy state to the transparent state and remains in the transparent state.

This change is repeatable.

Use of such a material enables the security image 12 to be read from the surface of the card 1 when the changeable layer 13 is in the transparent state and disables the security image 12 from being read because it is blinded when the changeable layer 13 is in the cloudy state.

In this way, externally setting the temperature of the changeable layer 13 at the clouding temperature or at the clarifying temperature enables the security image 12 on the card 1 to be placed in the display/undisplay state or the optically readable/unreadable state as desired.

In this case, as described above, the changeable layer 13 must be thick enough to enable the security image 12 to be placed in the display/undisplay state or the optically readable/unreadable state as desired. The layer is preferably in a range from several $\mu m$ to 100 $\mu m$ in thickness.

The material of the changeable layer 13 used in this embodiment can be clarified in a limited temperature range as shown in FIG. 3. The temperature at which the change begins and the temperature range vary with material. The material used here becomes transparent at temperatures ranging from approximately 60° C. to 110° C. and the temperature range allowing clarification is approximately 50° C.

Therefore, to read the blinded security image 12 intentionally, sufficiently controlled heating is needed. The controlled temperature range assures the high security of the recording medium of the present invention.

For a material for the changeable layer 13, light-transmitting materials whose coloring characteristic changes between cloudy and transparent reversibly, such as photochromic materials or high-molecular liquid-crystal materials, may be used.

FIG. 4 schematically shows the construction of an apparatus for performing security control using the card 1.

In FIG. 4, a thermal bar heating means 101 for heating the changeable layer 13 of the card 1 is composed of a thermal bar where a thick-film or thin-film band heating element 103 is formed on a ceramic substrate 102 and a driving means (not shown) for driving the thermal bar.

A security image reading means 104 is made up of a light source 105, an optical sensor 106 such as a CCD, and a driving means (not shown) for driving these units.

Transport rollers 108 to receive the card and transport rollers 107 for conveying the card 1 are each connected to driving means (not shown).

Security control with the above-mentioned apparatus will be explained.

The card 1 whose security image 12 is in the optically unreadable state is inserted into the apparatus. Then, the card 1 is taken in toward the direction shown by the arrow and conveyed to the heating means 101.

Based on the sensing of the insertion of the card 1, the heating means 101 drives the heating element 103 at a temperature enough to heat the changeable layer 13 to the clarifying temperature before the card 1 comes into contact with the heating element 103.

The temperature of the heating element 103 is controlled so as to be kept at the above temperature as long as the card 1 is in contact with the element.

When the heating means 101 has heated and clarified the changeable layer 13, the security image 12 on the card 1 goes to the readable state.

The card 1 whose security image 12 is made readable is further carried by the transport rollers 107 to the security image reading means 104, which reads the security image 12.

The security image 12 read is then collated with, for example, an image previously entered in the apparatus, whereby the truth of the card 1 is judged.

In this way, the card 1 whose security image 12 is in the optically unreadable state is inserted into the apparatus, and the security image 12 is placed in the optically readable state. In this state, security control is achieved by collating the security image 12 read with the previously entered image.

Next, the method of controlling an entrance an exit using the card 1 and the apparatus is explained below.

Figure 5A:
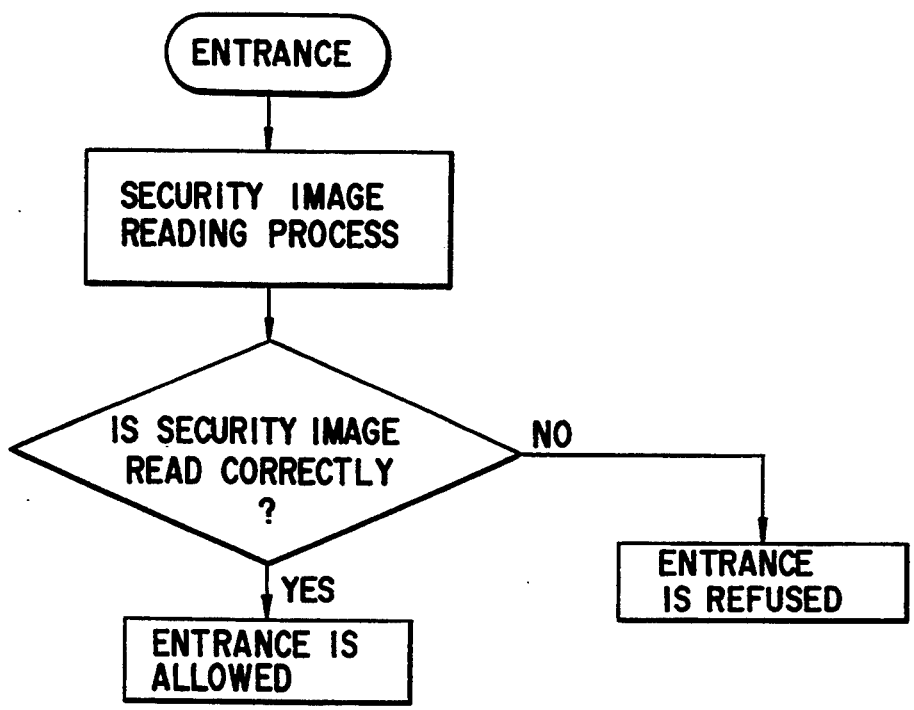
FIGS. 5A and 5B are flowcharts for explaining the flow of processing in the present invention in preventing the use of illegal cards in a specific section.
Figure 5B:
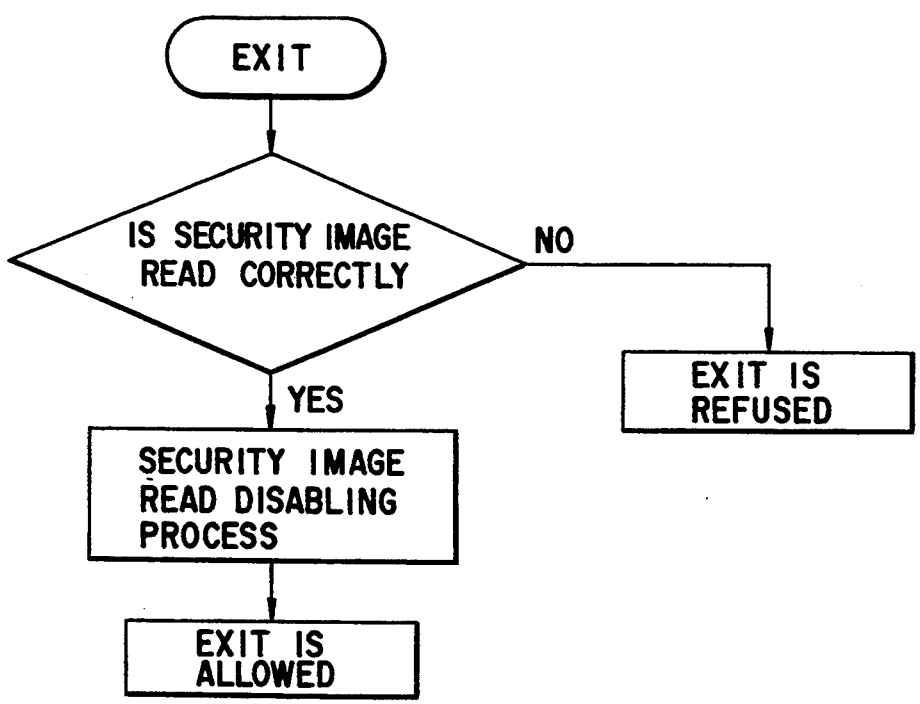

FIGS. 5A and 5B show a case where the illegal use of the card 1 is eliminated in a specified section by changing the display/undisplay state or the mechanically readable/unreadable state of the security image 12 in and out the specified section and by placing the security image 12 in the readable state in the specified section only.

Specifically, when a person goes into the specified section, the card 1 whose security image 12 is blinded is inserted into the apparatus and the truth of the card 1 is judged through the operation described above.

At this time, when the security image 12 cannot be read or does not agree with the previously entered image, the entrance is refused. Only persons who have inserted a valid card (whose security image coincides with the previously entered image) are allowed to enter.

In the specified section, because the security image 12 on the valid card is visually readable while the security image 12 on the card 1 of a trespasser remains unreadable, the trespasser can be easily distinguished from the people entering legitimately (the users of the valid card 1).

For exiting, the security image 12 is read and collated in a similar manner. When the result of the reading and collating process shows a doubt on the using state of the card 1, the exit of the user is refused.

In this way, by checking the security image 12 even at the time of exit, a person who has a valid card 1 but has entered illegally without passing through the entrance check can also be placed under the security control.

At the time of exit, the security image 12 on the card 1 is blinded again so as to be visually unreadable. This assures the high security outside the specified section by means of the security image 12.

Further, by changing the security image 12 from one system to another, from one section to another, and from user to user or by allowing selection of one out of a plurality of security images 12, higher security can be assured.

Figure 6:
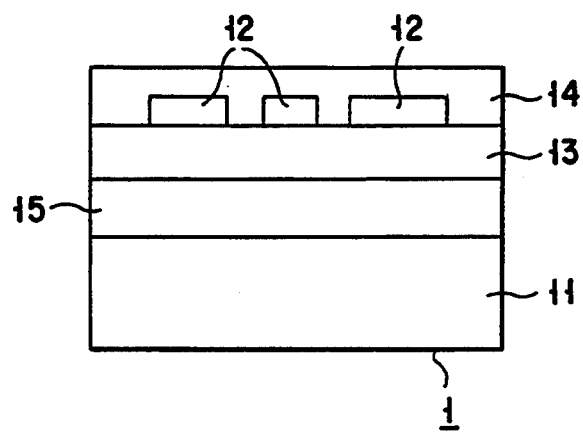
FIG. 6 is a sectional view schematically showing another construction of the card according the first embodiment of the present invention.

FIG. 6 shows another arrangement of the card 1 according to the first embodiment of the present invention.

The card 1 is constructed in such a manner that on a substrate 11 made of white vinyl chloride resin or polyester resin, a protective layer 14 made of a light-transmitting material (resin), a colored security image 12 formed in the protective layer 14, a changeable layer 13 whose transmittance changes reversibly and which is formed below the security image 12, a colored layer 15 formed between the changeable layer 13 and the substrate 11 and pigmented with the same color as or an optically similar color to that of the security image 12, are stacked in that order.

Between the colored layer 15 and the changeable layer 13 or between the changeable layer 13 and the protective layer 14, an intermediate layer may be formed, if necessary. In this case, an intermediate layer between the colored layer 15 and the changeable layer 13 must be able to transmit light.

with this card, because the security image 12 and the colored layer 15 have the same color or a similar color as shown in FIG. 2B when the changeable layer 13 is in a state allowing the color of the colored layer 15 to pass through (in this case, the transparent state), the security image 12 cannot be read optically.

On the other hand, when the changeable layer 13 is in a state cutting off the color of the colored layer 15 (in this case, the cloudy state), the security image 12 is in the readable state as shown in FIG. 2.

The changeable layer 13 may be colored provided that the security image 12 can be read optically.

Figure 7:
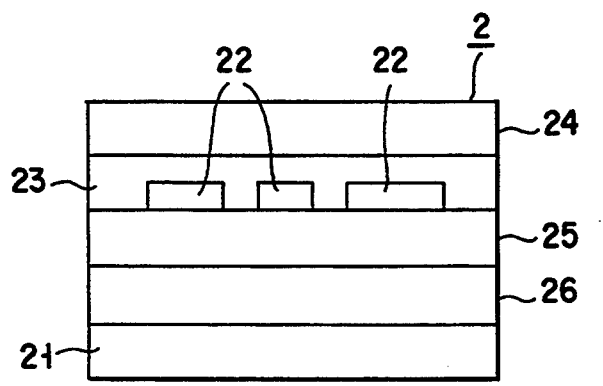
FIG. 7 is a sectional view schematically showing a construction of a card according a second embodiment of the present invention.

FIG. 7 shows a schematic construction of a card 2 according to a second embodiment of the present invention.

The card 2 contains a changeable section that can alternate repeatedly between a readable state and an unreadable state of a security image, and a memory section that stores specific information. The card 2 is composed of a substrate 21, a security image 22, a changeable layer 23, a protective layer 24, an underlying layer 25 for helping the good formation of the changeable layer 23, and a magnetic recording layer 26 as the information-storing section.

The card 2 is designed to encode the specific information using as a key the security image 22 read from the changeable section having the above function and to store the encoded information in the magnetic recording layer 26.

Figure 8:
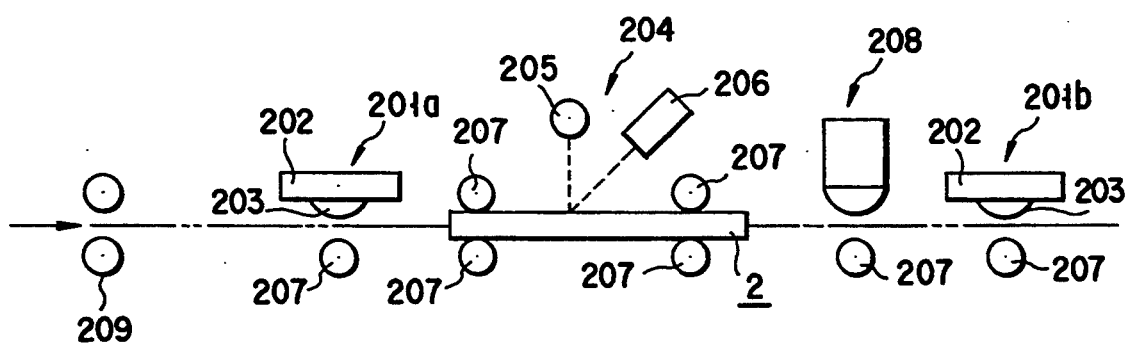
FIG. 8 is a schematic diagram of an apparatus for performing security control using the card.

FIG. 8 is a schematic diagram of an apparatus for performing security control using the card 2.

In FIG. 8, there are provided transport rollers 209 for taking in the card 2 inside the apparatus. Thermal bar heating means 201a and 201b for heating the changeable layer 23 of the card 2 are each composed of a thermal bar where a thick-film or thin-film band heating element 203 is formed on a ceramic substrate 202 and a driving means (not shown) for driving the thermal bar.

A security image reading means 204 is made up of a light source 205, an optical sensor 206 such as a CCD, and a driving means (not shown) for driving these units.

Transport rollers 207 for conveying the card 2 at a specified speed are each connected to driving means (not shown).

The magnetic recording means 208 is designed to write encoded information in the magnetic recording layer 26 of the card 2 and read the encoded information from the magnetic recording layer 26.

Figure 9:
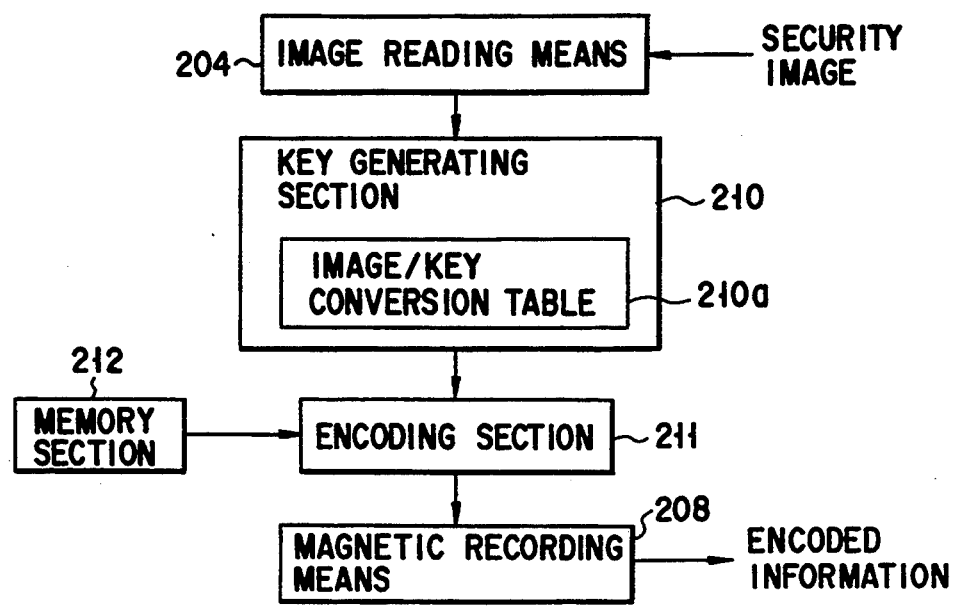
FIG. 9 is a block diagram of a portion for encoding information in the above apparatus.

FIG. 9 shows the construction of a portion related to the process of encoding information in the apparatus.

The security information read from the image reading means 204 is sent to a key generating section 210.

The security image information sent to the key generating section 210 is converted into a key code corresponding to the image, referring to the contents of a built-in image/key conversion table 210a. The key code converted at the key generating section 210 is outputted to an encoding section 211.

Receiving the key code, the encoding section 211 reads the previously entered information from a memory section 212 and encodes this information using the key code. The encoding process will be explained later.

The encoded information is then written by the magnetic recording means 208 into the magnetic recording layer 26 of the card 2.

Figure 10:
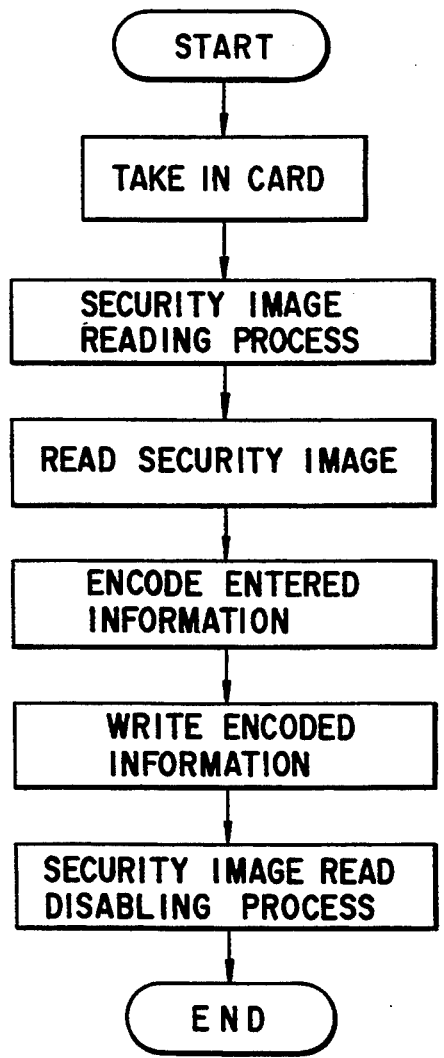
FIG. 10 is a flowchart for the process of issuing a card in the apparatus.

FIG. 10 shows the flow of the process of issuing the card 2 in the apparatus.

The card 2 whose security image 22 is in the optically unreadable state is inserted into the apparatus. Then, the card 2 is taken in by the transport roller 207 toward the direction shown by the arrow and conveyed to the heating means 201a.

Based on the sensing of the insertion of the card 2, the heating means 201a drives the heating element 203 at a temperature enough to heat the changeable layer 23 to the clarifying temperature before the card 2 comes into contact with the heating element 203.

The temperature of the heating element 203 is controlled so as to be kept at the above temperature as long as the card 2 is in contact with the element.

when the heating means 201a has heated and clarified the changeable layer 23, the security image 22 on the card 2 goes to the readable state.

The card 2 whose security image 22 is made readable is further carried by the transport rollers 207 to the security image reading means 204, which reads the security image 22.

The security image information read is converted into a key code on the basis of the contents of the image/key conversion table 210a. The key code is outputted to the encoding section 211.

The encoding section 211, when being supplied with the previously entered information read from the memory section 212, encodes this information using the key code.

As the card 2 is conveyed by the transport rollers 207, the encoded information is then written by the magnetic recording means 208 into the magnetic recording layer 26.

After this, the card 2 is carried by the transport rollers 207 to the heating means 201b, which heats and clouds the changeable layer 23, thereby making the security image 22 on the card 2 unreadable. At this time, the heating means 201b, like the heating means 201a, is kept at a temperature enough to heat the changeable layer 23 to the clouding temperature.

The card 2 whose security image 22 is judged to be unreadable is discharged from the apparatus and returned to the user.

In this way, the card 2 undergoes security control by recording the encoded information using the security image 22 as a key in the magnetic recording layer 26 and issuing the card after the security image 22 is placed in the optically unreadable state.

Because the thermal bar heating means 201a and 201b can change heating temperatures in less one second, the thermal bar heating means 201b in FIG. 8 can be eliminated.

In this case, the clouding process of the changeable layer 23 may be carried out by writing the encoded information in the magnetic layer 26, then reversing the transport direction of the card 2, and in the meantime, changing the heating temperature of the thermal bar heating means 201a from the clarifying temperature range to the clouding temperature range.

An example of the encoding process will be explained.

For example, when the security image 22 has a shape shown in FIG. 2A, the image of the changeable section read from the security image is a circle. The key code of the circle is expressed as 150 in the hexadecimal number system.

Further, when the information entered in the memory section 212 is expressed as 120224ABF in the hexadecimal number system, the encoding process is carried out as follows.

The entered information 120224ABF is first divided into sets of three digits: 120, 224, and ABF. The key code value of 150 is subtracted from each of these sets.

When the results are expressed in the hexadecimal number system, for 120, FFFFFFFFFD0 is given. In this case, the last three digits are used, giving the conversion result of FD0.

Similarly, 224 and ABF in the entered information are converted into 0D4 and 96F, respectively.

In this way, the entered information 120224ABF is finally converted into FD00D496F.

Next explained will be the operation of the security control system using the card 2.

Figure 11:
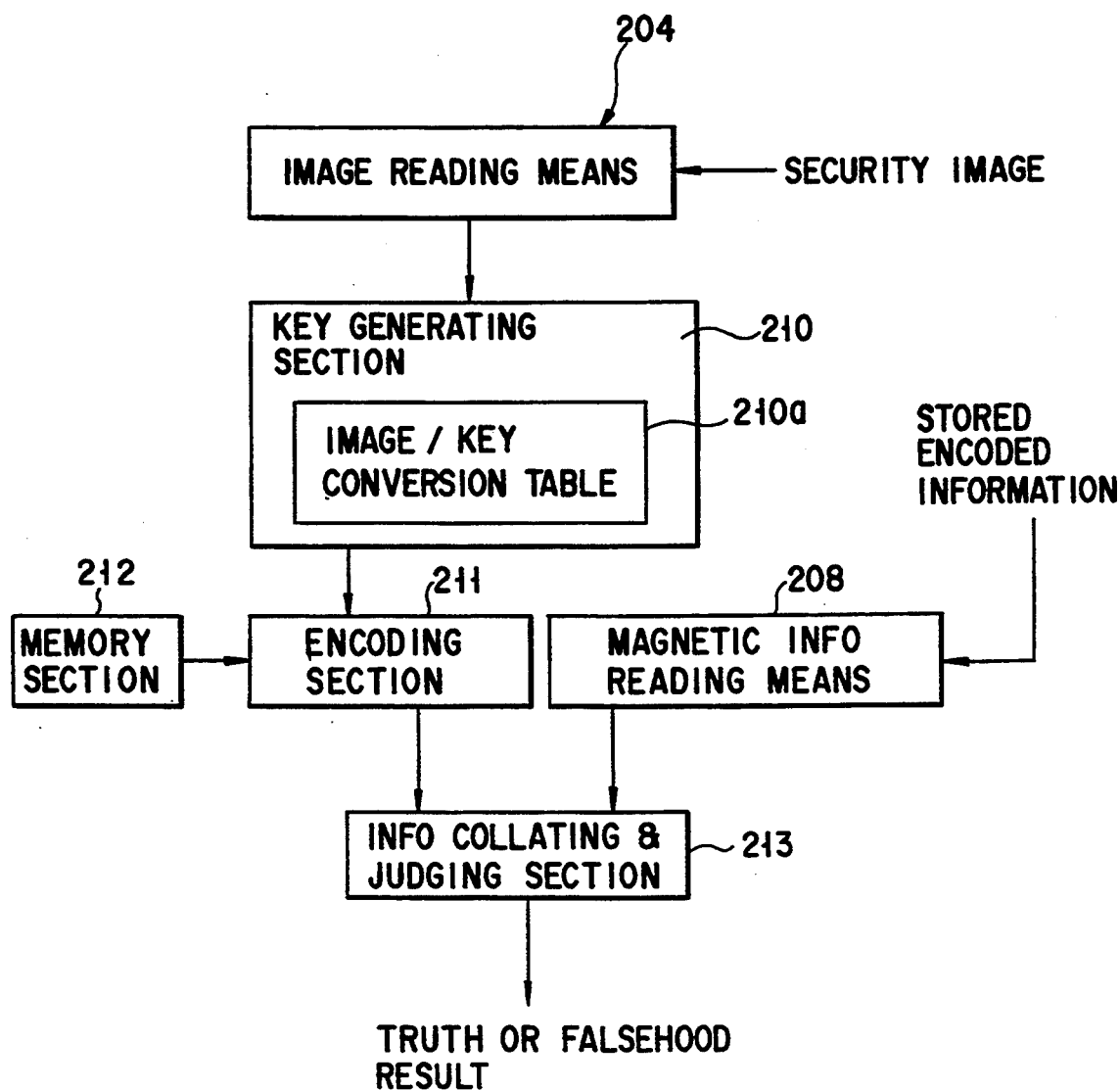
FIG. 11 is a block diagram of a portion for performing an encoding and a collating process in a security control system of the present invention.

FIG. 11 shows the construction of a portion related to the encoding process and the collating process in the security control system.

The security information read from the image reading means 204 is sent to the key generating section 210.

The security image information sent to the key generating section 210 is converted into a key code corresponding to the image, referring to the contents of the built-in image/key conversion table 210a. The key code converted at the key generating section 210 is outputted to the encoding section 211.

Receiving the key code, the encoding section 211 reads the previously entered information from the memory section 212 and encodes this information using the key code. The encoded information is sent to an information collating and judging section 213.

On the other hand, the encoded information stored in the magnetic recording layer 26 of the card 2 (the information obtained by encoding the same entered information in the memory section 212 using the same key code) is read by a magnetic information reading means used also as the magnetic recording means 208. This encoded information read is sent to the information collating and judging section 213.

The information collating and judging section 213 compares and collates the encoded information with the stored encoded information and judges whether or not the card 2 is valid.

Figure 12A:
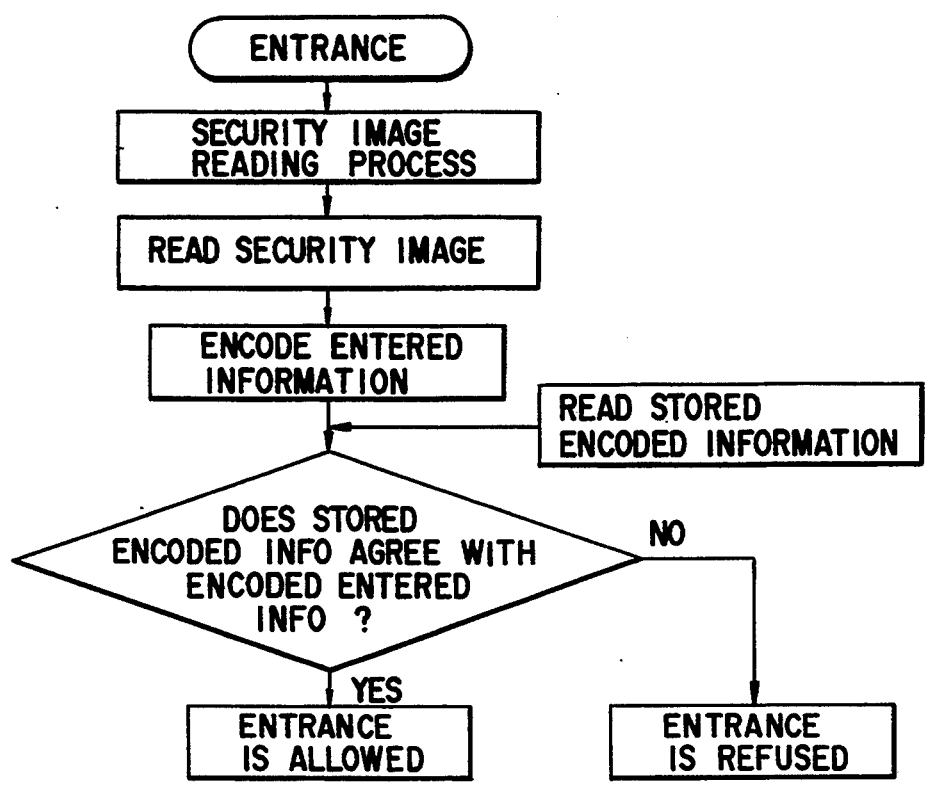
FIGS. 12A and 12B are flowcharts for the processing in the security control system in controlling an entrance and exit.
Figure 12B:
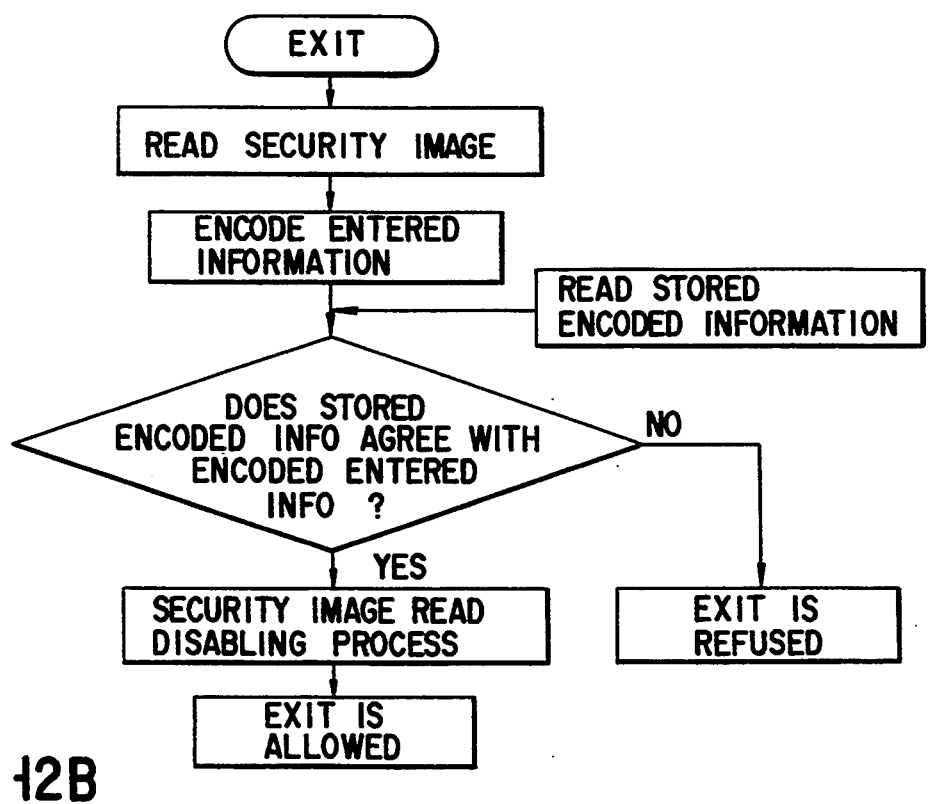

FIGS. 12A and 12B show the flow of the processing in the security control system when entrance and exit are controlled using the card 2 and the apparatus.

When a person goes into a specified section, the card 2 whose security image 22 is blinded is inserted into the apparatus of FIG. 8 (where the thermal bar heating means 201b is unnecessary). By the operation as described earlier, the changeable layer 23 is clarified and the security image 22 is read.

The image information read is converted at the key generating section 210 into a corresponding key code, referring to the image/key conversion table 210a and is then outputted to the encoding section 211.

Further, the previously entered information is read from the memory section 212. This information is encoded at the encoding section 211 using the key code and the encoded information is outputted to the information collating and judging section 213.

On the other hand, the magnetic information reading means (magnetic recording means) 208 reads the information stored in the magnetic recording layer 26 of the card 2, the information being obtained by encoding the same information as that on the apparatus side using the same key code. This information is then outputted to the information collating and judging section 213.

Then, the stored encoded information is collated with the entered encoded information at the information collating and judging means 213 to judge whether or not the card 2 is valid.

At this time, when the stored encoded information does not coincide with the entered encoded information or the security image 22 cannot be read in the above process, the entrance of the user of card 2 is refused. Only persons who have inserted a valid card 2 (the stored encoded information coincides with the entered encoded information) are given back the card 2 and allowed to enter.

In the specified section, because the security image 22 on the valid card 2 is visually readable while the security image 22 on the card 2 of a trespasser remains unreadable, the trespasser can be easily distinguished from the legitimate entering people (the users of the valid card 2).

In exiting from the specified section, the apparatus of FIG. 8 (where the thermal bar heating means 201a is unnecessary) installed at the exit reads the security image 22 and collates the stored encoded information with the entered encoded information as described above. Because these operations are similar to those explained above, their explanation will be omitted.

When the result of the reading and collating process shows a doubt on the using state of the card 2, the exit of the user is refused.

In this way, by checking the encoded information on the basis of the security image 22 even at the time of exit, a person who has a valid card 2 but has entered illegally can be placed under the security control.

At the time of exit, the security image 22 on the card 2 is blinded again so as to be visually unreadable. This prevents the security image 22 from being seen by a third party outside the specified section, thereby assuring the high security by means of the blinded security image 22.

Further, by changing the security image 22 from one system to another, from one section to another, and from user to user or by allowing selection of one out of a plurality of security images 22, higher security can be assured.

As described, the present system provides high security control by combining the two security modes: one mode is to change the display/undisplay state of the security image 22 in and out of the specified section and the other is to collate the encoded information on the card 2 with the encoded information on the system side, using the security image 22 as a key.

Figure 13:
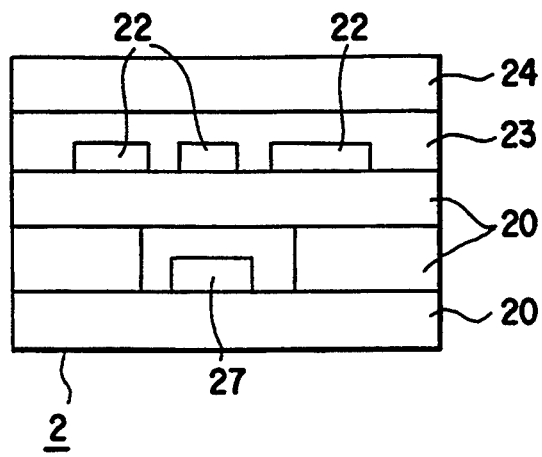
FIG. 13 is a sectional view schematically showing another construction of the card according to the second embodiment of the present invention.

FIG. 13 shows another construction of the card 2 according to the second embodiment of the present invention.

The card 2 contains a changeable section that can alternate repeatedly between a readable state and an unreadable state of a security image, and a memory section that stores specific information. The card 2 is composed of a substrate 20 made of a laminate of, for example, polyvinyl chloride sheets, a security image 22, a changeable layer 23, a protective layer 24, an IC memory 27 serving as an information memory section embedded in the substrate 20.

The card 2 is designed to encode the specific information using as a key the security image 22 read from the changeable section having the above function and to store the encoded information in the IC memory 27.

As described above, the present invention enables the security image to be read only when necessary, so that the security image can be prevented from being seen by a third party outside the controlled area, making it easy to control the security image.

Because the security image can be checked easily inside the controlled area, it is easy to judge whether a person is a trespasser or not.

Further, because neither a special light source nor a special sensing unit is required, the relatively low-cost, simple structure provides high secrecy and makes it difficult to forge the recording medium.

A third embodiment of the present invention will be explained.

Figure 14:
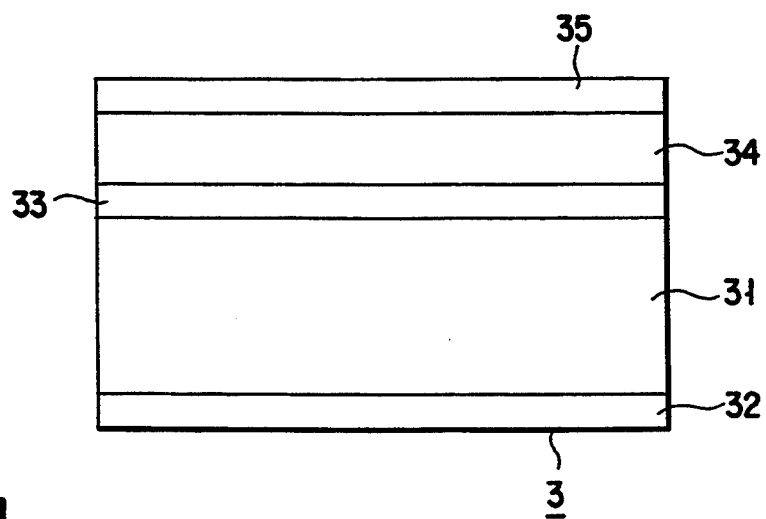
FIG. 14 is a sectional view schematically showing a construction of a card according a third embodiment of the present invention.

FIG. 14 shows a schematic construction of a card 3 according to a third embodiment of the present invention.

The card 3 is composed of a substrate 31 made of white vinyl chloride resin or polyester resin of approximately 10 μm to several mm in thickness, a preprinted layer 32 on which a picture or sentences are printed and which are formed all over the substrate 31, a black underlying layer 33, a changeable layer 34 on which a security image is recorded and which is made of a material that changes reversibly between a cloudy state and a transparent state depending on temperature, and a protective layer 35 made of a light-transmitting material.

The changeable layer 34 is made of a material having the same properties as those in the first and second embodiments.

The card 3 (a rewritable recording medium) 3 contains a changeable section that can record and erase an image reversibly.

Figure 15:
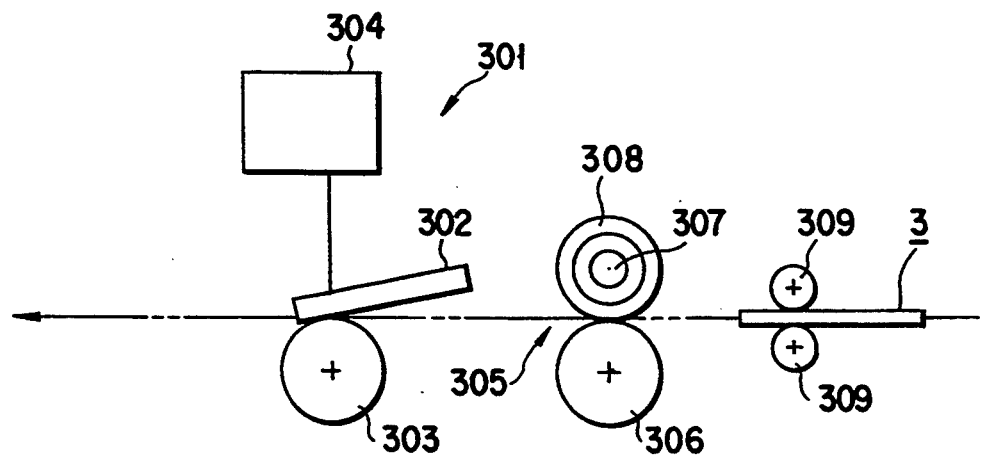
FIG. 15 is a schematic diagram of an apparatus for rewriting the security image on the card according to specified conditions.

FIG. 15 schematically shows the construction of an apparatus for rewriting a security image on the card 3 according to specified conditions.

In the apparatus, a thermal head recording means 301 is composed of a thermal head 302 having a heating element for applying thermal energy to the card 3 to cloud the latter, a platen roller 303, and a thermal head driving circuit 304 for controlling the supply of power to the heating element.

The thermal head 302 is a line recording head having a plurality of heating elements arranged in a row in a direction perpendicular to the direction in which the card 3 is transported.

A heating means 305 is composed of a platen roller 306, and a heat roller 308 where a heating lamp 307 is provided inside a rotating metal sleeve whose surfaces are coated with urethane rubber.

The heating lamp 307 is driven by a heat roller temperature control unit (not shown).

A pair of feed rollers 309 for conveying the card 3 at a constant speed is designed to be driven together with the platen rollers 303 and 306 and the heat roller 308 in an interlocking manner.

Figure 16:
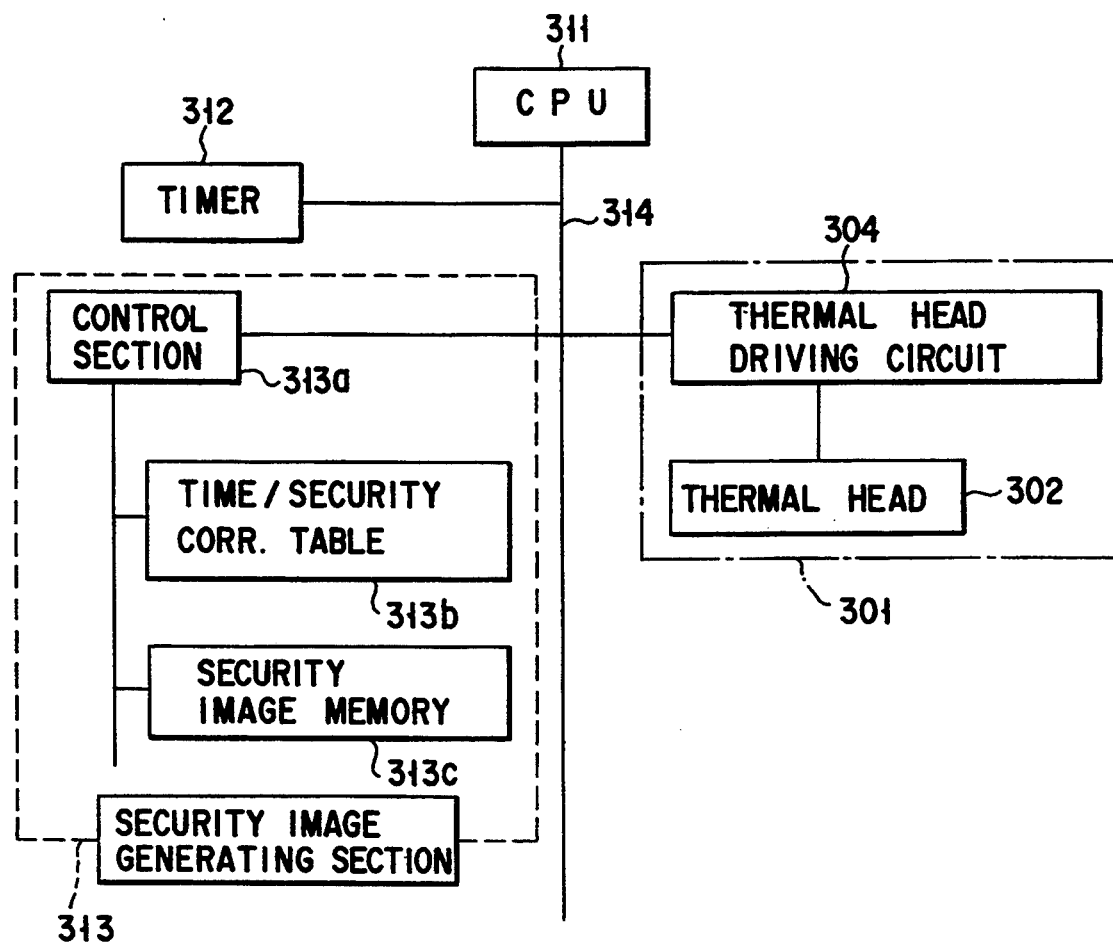
FIG. 16 is a block diagram schematically showing an important portion of the apparatus.

FIG. 16 schematically shows the construction of an important portion of the above apparatus.

In the figure, there are provided a CPU 311 for controlling the operation of the entire apparatus; a timer 312 having a clock function; a security image generating section 313; the thermal head recording means 301; and a bus 314 connecting the CPU 311 to each section.

The security image generating section 313 is composed of a control section 313a, a correspondence table 313b listing the correspondence of the time and the security image, and a security image memory 313c storing various types of security images.

The correspondence table 313b stores the time division data items obtained by dividing the time starting at 0:00 hour to 24:00 hour at intervals of two hours and the different security image code data items allocated to the individual time divisions.

The security image memory 331c stores the images corresponding to the security image codes stored in the correspondence table 313b in bit data form.

The operation of rewriting the security image on the card 3 in the above apparatus will be explained.

For example, when the card 3 is inserted into the apparatus, it is conveyed in the direction indicated by the arrow by the feed rollers 309 and sent to the heating means 305.

At this time, the heat roller 308 is previously set at a certain temperature so that the changeable layer 34 of the card 3 may be heated to the clarifying temperature ranging from approximately 70° C. to 100° C. The passing of the card 3 through the heat roller 308 causes the changeable layer 34 to be clarified, erasing the security image recorded there.

The image-erased card 3 is further conveyed to the thermal head recording means 301.

The thermal head recording means 301, receiving the card 3, records a new security image onto the changeable layer 34 of the card 34. The recording is done by driving the heating resistive elements of the thermal head 302 corresponding to the pixels to be recorded to 110° C. at which the changeable layer 34 turns cloudy.

Here, this new security image is determined as described below and sent to the thermal head recording means 301.

Specifically, when the CPU 311 senses the insertion of the card 3 into the apparatus, it outputs a security-image generating signal to the control section 313a of the security image generating section 313.

Then, the control section 313a, receiving the time information from the timer 312, reads a code data item for the security image corresponding to the time information from the time/security image correspondence table 313b. At the same time, it outputs to the thermal head recording means 301 the bit data items for the security image read from the security image memory 313 corresponding to the code data item.

Then, according to the print instruction from the CPU 311, the bit data items for the security image read from the security image memory 313c are outputted to the thermal head recording means 301.

In the thermal head recording means 301, the thermal head driving circuit 304, receiving the bit data items, drives the thermal head 302 to cloud the changeable layer 34 of the card 3 according to the bit data items to record the selected security image there.

With this embodiment, selectively rewriting the security image by time division makes it easy to distinguish the valid card from an invalid card whose security image is printed as a fixed image (the security image may be determined by other specific requirements, such as the input sequence of the card or symbols specifying areas for controlling a section).

Consequently, the card is difficult to forge unless the card has a rewritable memory section and a changeable section performance equivalent to that of the card 3 used in the apparatus.

Next explained will be a fourth embodiment of the present invention.

Figure 17:
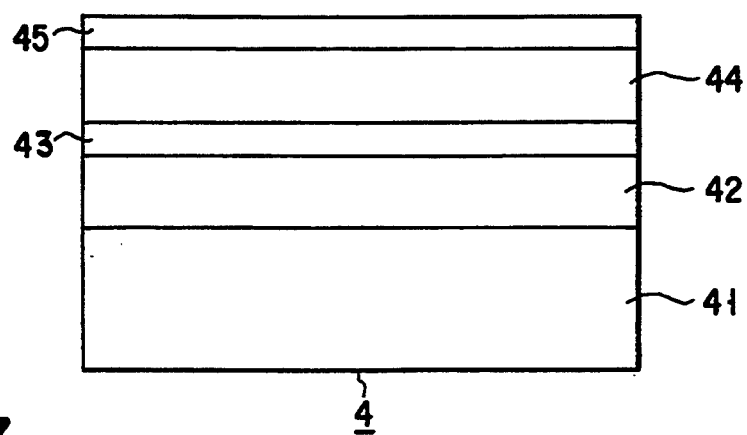
FIG. 17 is a sectional view schematically showing a construction of a card according a fourth embodiment of the present invention.

FIG. 17 shows a schematic construction of a card according to a fourth embodiment of the present invention.

The card 4 contains a changeable section capable of recording and erasing an image reversibly and a memory section for storing information. Numeral 41 indicates a substrate made of white vinyl chloride resin or polyester resin of approximately 10 $\mu$m to several mm in thickness; 42 a magnetic recording layer as the memory section; 43 a black underlying layer; 44 a changeable layer made of a material that changes reversibly between a cloudy state and a transparent state depending on temperature; and 45 a protective layer made of a light-transmitting material.

The changeable layer 44 is made of a material having the same properties as those in the first, second, and third embodiments.

The card (a rewritable recording medium) 4 contains the changeable section that can record and erase an image reversibly and the memory section that can record information in magnetically encoded form.

Figure 18:
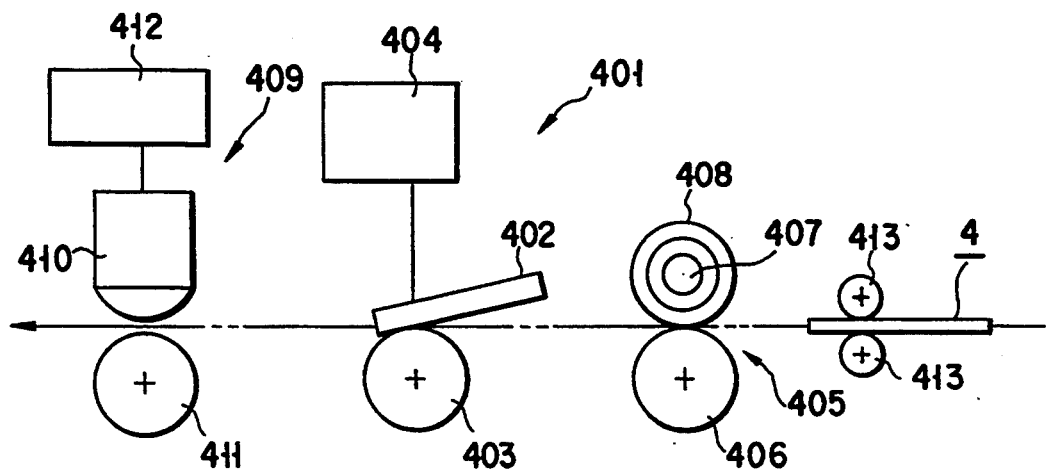
FIG. 18 is a schematic diagram of an apparatus of the present invention for rewriting the security image and information on the card according to specified conditions.

FIG. 18 schematically shows the construction of an apparatus for rewriting the security image and the information on the card 4 according to specified requirements.

A thermal head recording means 401 is composed of a thermal head 402 having a heating resistive element for applying thermal energy to the card 4 to cloud the latter, a platen roller 403, and a thermal head driving circuit 404 for controlling the supply of power to the heating resistive element.

The thermal head 402 is a line recording head having a plurality of heating elements arranged in a row in a direction perpendicular to the direction in which the card 4 is transported.

A heating means 405 is composed of a platen roller 406, and a heat roller 408 where a heating lamp 407 is provided inside a rotating metal sleeve whose surfaces are coated with urethane rubber.

The heating lamp 407 is driven by a heat roller temperature control unit (not shown).

The magnetic recording means 409 is composed of a magnetic recording head 410 for writing information in the magnetic recording layer 42 of the card 4 and reading the information, a platen roller 411, and a driving section 412.

A pair of feed rollers 409 for conveying the card 4 at a constant speed is designed to be driven together with the platen rollers 403, 406, and 411 and the heat roller 408 by a driving system (not shown) in an interlocking manner.

Figure 19:
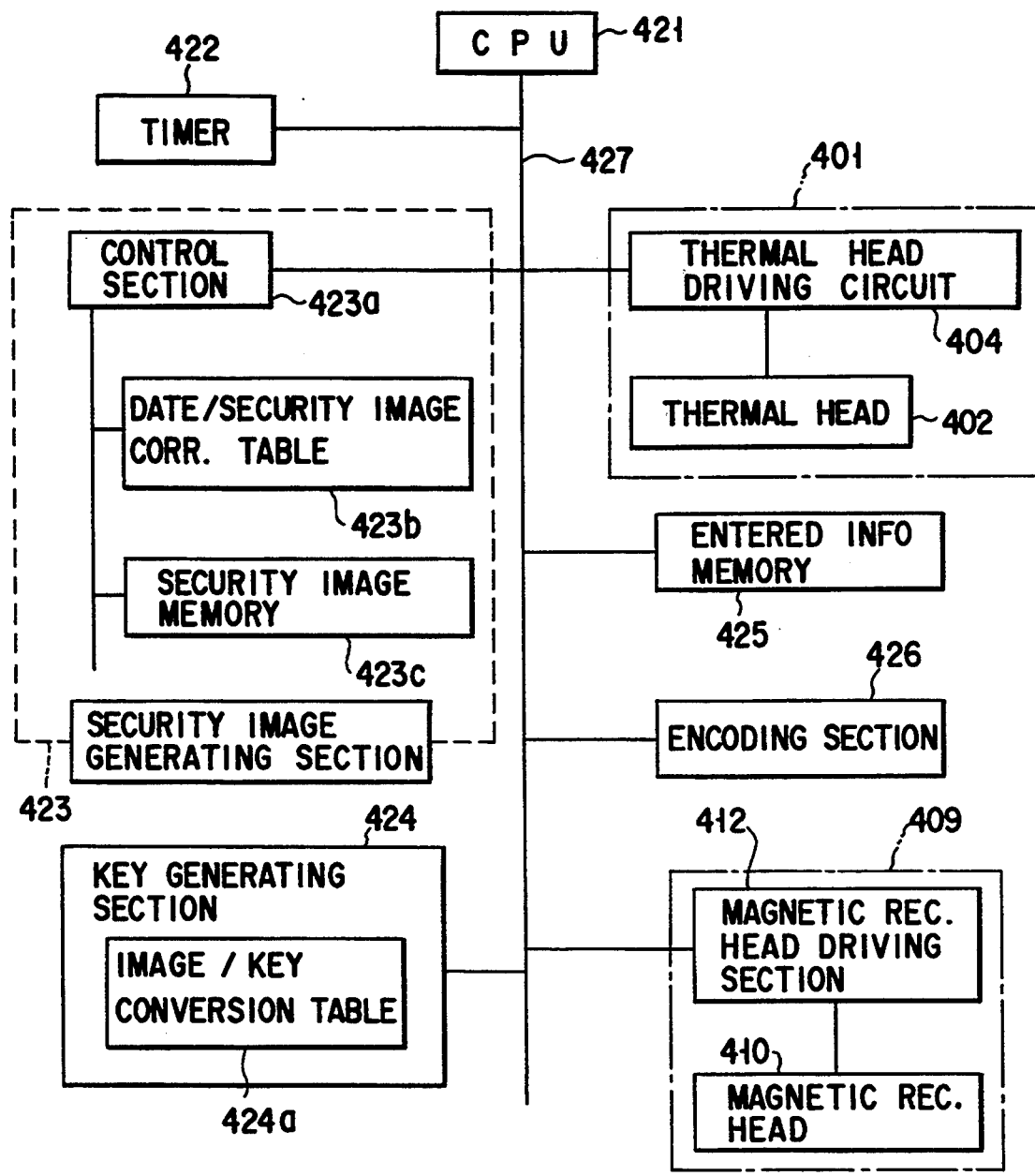
FIG. 19 is a block diagram schematically showing an important portion of the apparatus.

FIG. 19 schematically shows the construction of an important portion of the above apparatus.

In the figure, there are provided a CPU 421 for controlling the operation of the entire apparatus, a timer 422 having a clock function, a security image generating section 423, a key generating section 424 for generating a code key corresponding to the security image, an entered information memory 425 for storing previously entered information for encoding, an encoding section 426 for encoding the entered information using a code key, and a bus 427 connecting the CPU 421 to each section.

Also connected via the bus 427 to the CPU 421 are the thermal head recording means 401 and magnetic recording means 409.

The security image generating section 423 is composed of a control section 423a, a correspondence table 423b listing the correspondence of the date and the security image, and a security image memory 423c storing various types of security images.

The correspondence table 423b stores, for example, the week division data items divided by week and the different security image code data items allocated to each division.

The correspondence table 423c stores the images corresponding to the security images stored in the correspondence table 423b in bit data form.

The key generating section 424 obtains a code key corresponding to the security image code, referring to the built-in image/key conversion table 424a.

The operation of rewriting the security image and the magnetic information on the card 4 in the above apparatus will be explained.

For example, when the card 4 is inserted into the apparatus, it is conveyed in the direction indicated by the arrow by the feed rollers 413 and sent to the heating means 405.

At this time, the heat roller 408 is previously set at a certain temperature so that the changeable layer 44 of the card 4 may be heated to the clarifying temperature ranging from approximately 70° C. to 100° C. The passing of the card 4 through the heat roller 408 causes the changeable layer 44 to be clarified, fully erasing the security image recorded there.

The image-erased card 4 is further conveyed to the thermal head recording means 401.

The thermal head recording means 401, receiving the card 4, records a new security image onto the changeable layer 44 of the card 4. The recording is done by driving the heating resistive elements of the thermal head 402 corresponding to the pixels to be recorded to 110° C. at which the changeable layer 44 turns cloudy.

The card 4 on which the new security image has been written is further carried to the magnetic recording means 409.

When the card 4 has arrived at the magnetic recording means 409, the magnetic recording head 410 rewrites the information in the magnetic recording layer 42 of the card 4 with the new encoded information.

Specifically, the insertion of the card 4 into the apparatus is sensed by the CPU 421, a security image generating signal is outputted to the control section 423a of the security image generating section 423.

Then, the control section 423a gets the data information from the timer 422 and reads a code data item corresponding to the week from the date/security image correspondence table 423b. At the same time, it obtains an image corresponding to the code data item from the security image memory 423c.

Then, according to the print instruction from the CPU 421, the bit data items for the security image obtained from the security image memory 423c are outputted to the thermal head recording means 401.

In the thermal head recording means 401, the thermal head driving circuit 404, receiving the bit data items, drives the thermal head 402 to cloud the changeable layer 44 of the card 4 according to the bit data items to record the selected security image there.

On the other hand, the security image generating section 423 outputs security image code data to the key generating section 424.

The key generating section 424 obtains a code key corresponding to the security image code data item, referring to the contents of the image/key conversion table 424a and outputs the result to the encoding section 426.

The encoding section 426, receiving the entered information from the entered information memory 425, encodes the entered information using the code key. The encoded information is sent to the magnetic recording means 409.

In the magnetic recording means 409, the magnetic recording head driving section 412, based on the encoded information received, drives the magnetic recording head 410 to rewrite the magnetic information recorded in the magnetic recording layer 42 of the card 4 with the new encoded information.

In this way, high security control can be achieved by selectively rewriting the security image according to specified requirements, in this embodiment, according to the date division (the week) and then rewriting the encoded entered information on the basis of the selected security image.

Here, an example of the encoding process will be explained.

For example, if the security image recorded on the changeable layer 44 is a circle, in previously explained way, the entered information 120224ABF is finally converted into FD00D496F.

Consequently, as the circle of the security image is recorded, FD00D496F as encoding information is also magnetically recorded on the magnetic recording layer 42 of the card 4.

It is assumed that for the card 4 on which the circle as the security image and FDD00D496F as the encoding information has been recorded, for example, "a star" is selected as a new security image.

In this case, if the code key for the star is expressed as 027, 120224ABF as the entered information is converted into an encoding information item of 0F91FDA98 through processes as described above.

Therefore, when the security image is changed to a star, the encoding information item is also changed to 0F91FDA98 accordingly.

By doing this, when the card 4 and the apparatus are applied to entrance control, the security image code necessary for entrance to the controlled section will be updated under the conditions set by the management side. Thus, it is difficult to enter illegally unless a person uses a recording medium having a rewritable recording section and a changeable section performance equivalent to that of the recording medium used in the apparatus.

Next explained will be exit control using the card 4.

Figure 20:
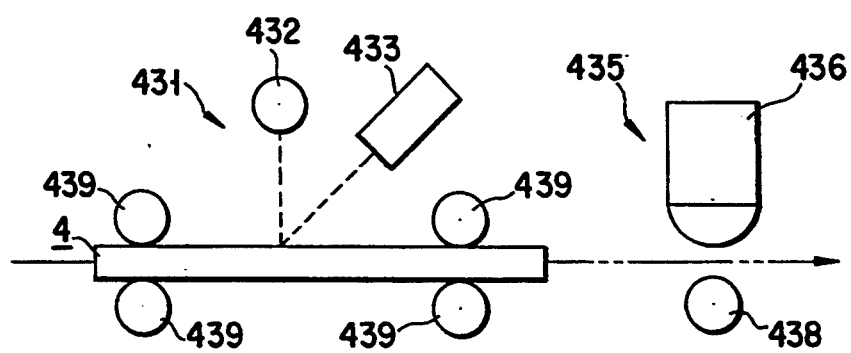
FIG. 20 is a schematic diagram of an apparatus of the present invention used to control exit from the controlled section.

FIG. 20 is a schematic diagram of an apparatus for controlling the exit of people from the controlled section after the people have entered the controlled section using the cards 4 on which the above apparatus has written the security image and the encoded entered information.

Specifically, the security image reading means 431 is composed of a light source 432, a CCD line sensor 433, and a CCD driving section (not shown) for driving the sensor.

A magnetic reading means 435 is composed of a magnetic reading head 436 for reading magnetic information from the magnetic recording layer 42 of the card 4, a head driving section (not shown) for driving the head, and a platen 438.

Numeral 439 indicates transport rollers for conveying the card 4 at a constant speed. The rollers are driven together with the platen roller 438 by a driving system (not shown) in an interlocking manner.

FIG. 21 is a block diagram showing the construction of an important portion of the above apparatus.

In the figure, there are provided a CPU 441 for controlling the operation of the entire apparatus, an entered information memory 442 for storing previously entered information, an image code converting section 443 for converting the security image read into an image code, an image code/key converting section 444 for converting an image code into a code key, an encoding section 445 for encoding the entered information using a code key, and a decoding section 446 for decoding the encoded information read from the magnetic recording layer 42 of the card 4 using the code key.

A security information collating section 447 collates the encoded information read from the magnetic recording layer 42 of the card 4 with the entered information encoded at the encoding section 445 or the entered information stored in the entered information memory 442 with the information read from the magnetic recording layer 42 of the card 4 and decoded at the decoding section 446. The bus 448 connects the CPU 441 with each section. The door driver 449 connected to the bus 448 drives a door for this inventions security system.

Also connected to the bus 448 of the CPU 441 are the CCD driving section 434 for driving the CCD line sensor 433 in the security image reading means 431, and the magnetic reading head driving section 437 for driving the magnetic reading head 436 in the magnetic reading means 435.

An example of controlling exit in the above apparatus will be explained.

It is assumed that when leaving the controlled section, a person has inserted a card 4 into the slot of the apparatus, the card 4 having a security image and encoded information items written on it.

Then, the inserted card 4 is conveyed by the transport rollers 439 in the direction indicated by the arrow and sent to the security image reading means 431. The CCD line sensor 433 of the security image reading means 431 reads the security image recorded on the changeable layer 44.

On the other hand, the card 4 from which the security image has been read is further conveyed by the transport rollers 439 to the magnetic reading means 435. Then, the magnetic reading head 436 of the magnetic reading means 435 reads the encoded entered information from the magnetic recording layer 42 of the card 4.

The security image data read from the CCD line sensor 433 is supplied from the CCD driving section 434 via the bus 448 to the image code converting section 443 and the image code corresponding to the image is inputted to the image code/key converting section 444 via the bus 448.

The image code inputted to the image code/key converting section 444 is converted into a corresponding code key, which is then outputted to the encoding section 445 and the decoding section 446.

The encoding section 445, supplied with the code key, encodes the entered information inputted from the entered information memory 442, using the code key. The details of the encoding process are the same as those explained earlier and their explanation will be omitted.

The information encoded at the encoding section 445 is outputted to the security information collating section 447.

On the other hand, the encoded entered information read by the magnetic reading head 436 is inputted to the security information collating section 447 via the bus 448.

The information encoded at the encoding section 445 and the encoded entered information read by the magnetic reading head 436 are inputted to the security information collating section 447, which then collates these pieces of information with each other.

When the collation result shows they do not coincide with one another, an indication that the person is not allowed to exit appears on a display unit (not shown) and the exit of the user of the card is refused.

The collating process may be carried out as follows.

The encoded entered information read by the magnetic reading head 436 is inputted to the decoding section 446 via the bus 448, which then decodes the information using the code key inputted from the image code/key converting section 444.

The decoding process is the reverse of the encoding process explained earlier using examples, and its explanation will be omitted.

The entered information decoded at the decoding section 446 is inputted to the security information collating section 447, which collates it with the entered information inputted from the entered information memory 442. When the collation result shows they do not coincide with one another, an indication that the person is not allowed to exit appears on a display unit (not shown) and the exit of the user of the card is refused.

As a result of the collation at the security information collating section 447, only when it is judged that the information encoded at the encoding section 445 agrees with the encoded entered information read from the magnetic reading head 436 or only when the entered information decoded at the decoding section 446 coincides with the entered information from the entered information memory 442, the person is allowed to exit.

While in this embodiment, to assure the high security, the two collating processes are used, only one collating process may be used for checking illegal entry (exit control).

A security control system for controlling the entrance into and exit from the controlled section can be realized by causing the apparatus at the entrance to write the security image and the encoded entered information on the card for entrance control and by causing the apparatus at the exit to control illegal entry.

Specifically, the entrance into and exit from a specified section can be controlled with a high security by using a recording medium with a changeable section capable of recording and erasing an image reversibly and a memory section, and when a person enters the specified section, recording a security image on the changeable section according to specified conditions, storing the encoded entered information using the security image as a key in the memory section, and by, when the person leaves the specified section, reading the security image from the changeable section, encoding the entered information using the image read as a key, collating the encoded information with the encoded information stored in the memory section, or decoding the encoded information stored in the memory section, using the image read as a key and collating the decoded information with the entered information.

As mentioned above, with this embodiment, because the security image can be rewritten according to the requirements determined by the system, a third party cannot know the security image. Further, a combination of the security image and the encoded information using the security image as a key provides high secrecy.

Figure 22:
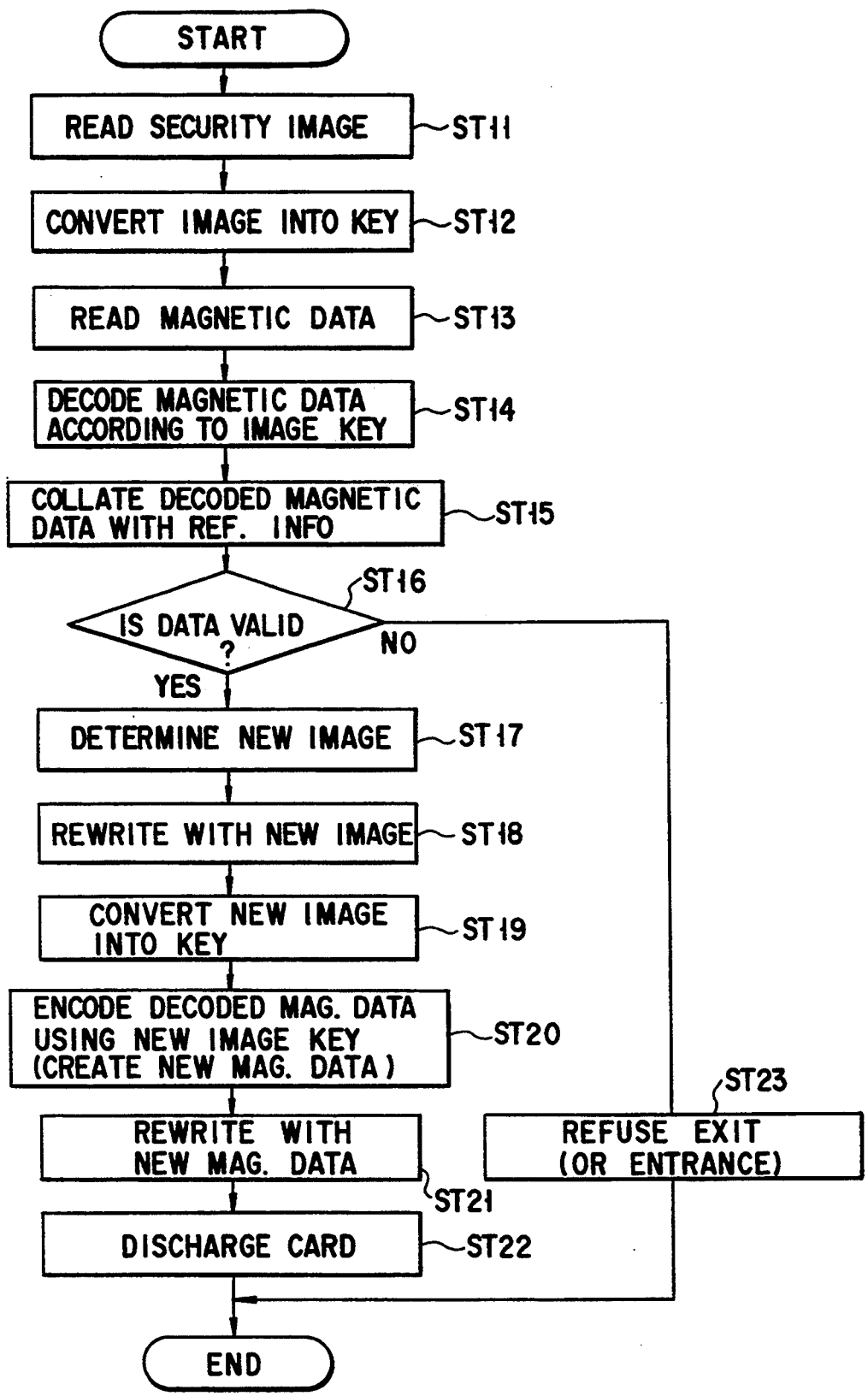
FIG. 22 is a flowchart of an example of processing the card of the present invention.
Figure 23:
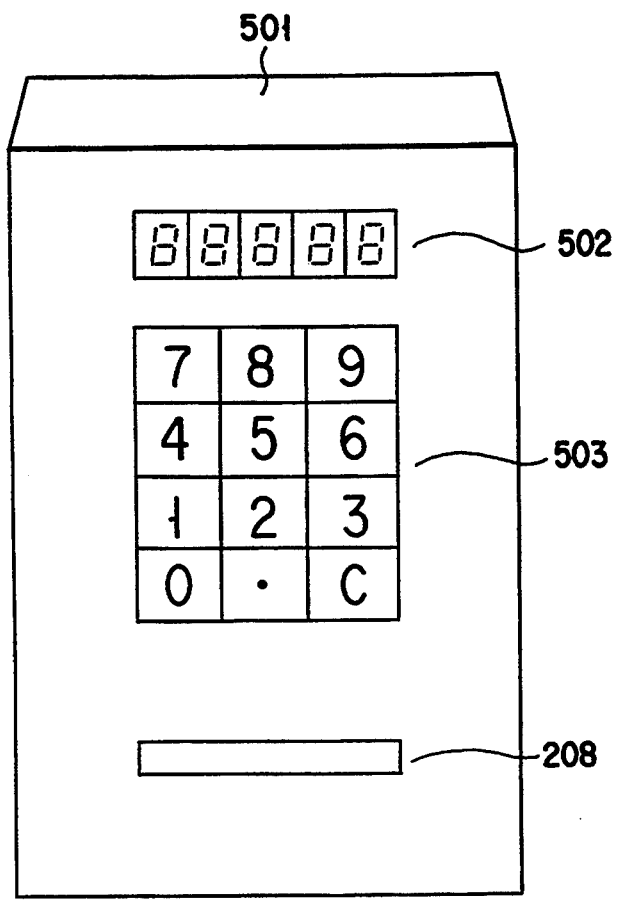
FIG. 23 is an outward view of a card processing apparatus of the present invention.
Figure 24:
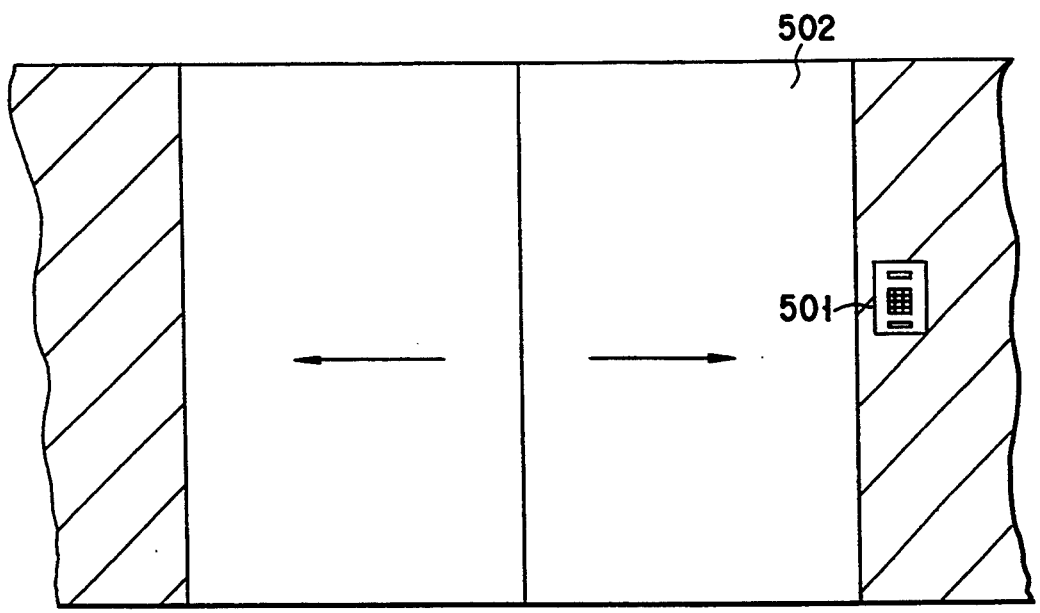
FIG. 24 is a pictorial diagram of an application of an entrance/exit control system of the present invention.

Another example of the operation of an entrance/exit control system using the present invention will be explained briefly, using a flowchart. FIG. 22 is a flowchart for an example of processing the card of the present invention. FIG. 23 is an outward view of a card processing apparatus of the present invention in FIG. 20. FIG. 24 is a pictorial diagram of an application of an entrance/exit control system of the present invention.

In FIG. 23, an operator unit 501 of the entrance/exit control system 501 is provided with a card insert/return slot 208, a keyboard enter key 503, and a numeral display unit 502. In FIG. 24, for example, the operator unit is installed near a door 502 at the entrance and exit of the controlled section, taking into account people passing through the door.

In FIG. 23, for example, when a person enters, the security image reading means 431 first reads the security image from a card 4 of the present invention inserted into the card processing apparatus 501 of the present invention (ST11). Then, a code key specified by the security image is obtained (ST12). Next, the encoded magnetic information stored in the magnetic memory layer 42 of the card is read by the magnetic reading head 436 (ST13). Then, this magnetic information read is decoded into the original magnetic information, using the code key corresponding to the security image (ST14). The decoded magnetic information is then collated with the reference information in the card processing apparatus 501 to determine whether or not the decoded magnetic information is valid (ST15). This process may be carried out at either the entrance or the exit or at both, depending on the degree of security required. In this process, if the data is invalid, the entrance (or the exit) is refused (ST23). If the data is valid, a new security image is determined according to specified requirements, such as the date or the section (ST17). Next, the thermal head recording means 401 rewrites the security image on the changeable layer 44 of the card 4 with the new security image (ST18). Further, a code key corresponding to the new security image is obtained (ST19). Then, the magnetic recording information decoded at step 14 is encoded, using the new code key this time (ST20). The magnetic recording layer 42 of the card 4 is rewritten with the new encoded magnetic information again (ST21). As a result of this, the card 4 is rewritten with the new security image and the new encoded magnetic information corresponding to the new security image. This card is discharged outside the card processing apparatus 501 (ST22).

With this method, because a combination of the security image and the encoded information using the security image as a key is used, it is difficult to forge or alter the recording medium.

Further, neither a special light source nor a special sensing unit is required, the relatively low-cost, simple structure provides high secrecy.

The present invention is not limited to the above embodiments but may be practiced or embodied in still other ways without departing from the spirit or character thereof.

As described in detail, with the present invention, it is possible to provide a recording medium combining low cost and high security, a recording apparatus using the recording medium, and an entrance/exit control system using the recording medium.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A visible image displaying medium comprising:
   a substrate on which a visible image is formed; and
   a displaying layer, disposed on said substrate, said displaying layer changing to a transparent state to display said visible image when said displaying layer is heated to a first temperature and said displaying layer changing to a cloudy state to prevent visualization of said visible image when said displaying layer is heated to a second temperature which is higher than said first temperature.

2. A visible image displaying medium according to claim 1, further comprising means, formed on said substrate, for storing specific data items.

3. A visible image displaying medium according to claim 2, wherein said storing means contains a magnetic memory device.

4. A visible image displaying medium according to claim 2, wherein said storing means contains a semiconductor memory device.

5. A visible image displaying medium according to claim 1, wherein said first temperature ranges from approximately 60° C. to 110° C.

6. An apparatus for processing a recording medium having a substrate on which a visible image is formed and a displaying layer, disposed on said substrate, such that when said displaying layer is heated to a first temperature, said displaying layer changes to a transparent state to display said visible image, and when said displaying layer is heated to a second temperature which is higher than said first temperature, said displaying layer changes to a cloudy state to prevent visualization of said visible image, said apparatus comprising:
   means for heating said visible image; and
   means for reading said visible image on said recording medium through said displaying layer.

7. A processing apparatus according to claim 6, wherein said heating means is formed into an integral structure.

8. A processing apparatus according to claim 6, wherein said recording medium further comprising means, formed on said substrate, for storing specific data items; and
   said processing apparatus further comprises means for rewriting information in said storing means.

9. A processing apparatus according to claim 8, further comprising means for converting said data in said storing means according to said visible image on said displaying means.

10. A processing apparatus according to claim 6, wherein said first temperature ranges from approximately 60° C. to 110° C.

11. A gate apparatus for processing a recording medium and determining whether to permit or inhibit passage of a person, said recording medium having a substrate on which a visible image is formed, and a displaying layer disposed on said substrate, said displaying layer changing to a transparent state when heated to a first temperature and changing to a cloudy state when heated to a second temperature higher than said first temperature, thus hiding said visible image, said gate apparatus comprising:
   first means for heating said displaying layer to said first temperature so as to display said visible image;
   means for reading said visible image through said displaying layer;
   second means for heating said displaying layer to said second temperature thereby changing said displaying layer to said cloudy state so as to hide said visible image;
   means for determining whether to permit or inhibit passage of a person in accordance with said visible image read by said reading means; and
   means for permitting or inhibiting passage of said person in accordance with said determination performed by said determining means.

12. An image display medium processing apparatus according to claim 11, wherein said first temperature ranges from approximately 60° C. to 110° C.

* * * * *